(12) United States Patent
Crowther-Alwyn et al.

(10) Patent No.: US 9,790,111 B2
(45) Date of Patent: Oct. 17, 2017

(54) METHOD FOR THICKENING OR DEHYDRATING SLUDGE

(71) Applicant: ROQUETTE FRERES, Lestrem (FR)

(72) Inventors: Laura Crowther-Alwyn, Armentieres (FR); Medhi Carre, Pelves (FR); Michel Simon, St Gratien (FR)

(73) Assignee: Roquette Freres, Lestrem (FR)

( * ) Notice: Subject to any disclaimer, the term of this patent is extended or adjusted under 35 U.S.C. 154(b) by 116 days.

(21) Appl. No.: 14/648,068

(22) PCT Filed: Nov. 28, 2013

(86) PCT No.: PCT/FR2013/052884
§ 371 (c)(1),
(2) Date: May 28, 2015

(87) PCT Pub. No.: WO2014/083283
PCT Pub. Date: Jun. 5, 2014

(65) Prior Publication Data
US 2015/0315056 A1    Nov. 5, 2015

(30) Foreign Application Priority Data
Nov. 28, 2012 (FR) .................................... 12 61342

(51) Int. Cl.
| | |
|---|---|
| *B01D 21/01* | (2006.01) |
| *C02F 1/52* | (2006.01) |
| *B03D 3/00* | (2006.01) |
| *C08L 33/26* | (2006.01) |
| *C08L 3/04* | (2006.01) |
| *D21H 17/29* | (2006.01) |
| *D21H 17/37* | (2006.01) |
| *C02F 11/12* | (2006.01) |
| *C02F 1/54* | (2006.01) |
| *C02F 1/56* | (2006.01) |
| *C02F 11/14* | (2006.01) |
| *C02F 103/32* | (2006.01) |
| *C02F 103/28* | (2006.01) |

(52) U.S. Cl.
CPC ............. *C02F 1/5263* (2013.01); *C02F 1/52* (2013.01); *C02F 1/54* (2013.01); *C02F 1/56* (2013.01); *C02F 11/12* (2013.01); *C02F 11/14* (2013.01); *C08L 3/04* (2013.01); *C08L 33/26* (2013.01); *D21H 17/29* (2013.01); *D21H 17/37* (2013.01); *C02F 2103/28* (2013.01); *C02F 2103/32* (2013.01)

(58) Field of Classification Search
CPC .. C02F 1/5263; C02F 1/56; C02F 1/54; C02F 1/52; C02F 2103/28; C02F 2103/32; C02F 11/12; C02F 11/14; D21H 17/20; D21H 17/21; D21H 17/24; D21H 17/28; D21H 17/29; D21H 17/33; D21H 17/37; C08L 3/04; C08L 33/26

USPC ................ 210/723, 727–731; 162/175, 158
See application file for complete search history.

(56) References Cited

U.S. PATENT DOCUMENTS

| | | | |
|---|---|---|---|
| 2,995,513 | A | 8/1961 | Eugene |
| 3,842,005 | A | 10/1974 | Kenneth et al. |
| 4,382,864 | A | 5/1983 | Hashimoto et al. |
| 4,579,944 | A | 4/1986 | Harvey et al. |
| 7,754,087 | B2 * | 7/2010 | Whittaker ................. C02F 1/56 210/727 |
| 2004/0112559 | A1 * | 6/2004 | Du Bourg ................. C02F 1/54 162/175 |
| 2011/0062081 | A1 * | 3/2011 | Daines-Martinez ...... C02F 1/44 210/636 |

FOREIGN PATENT DOCUMENTS

| | | |
|---|---|---|
| CN | 1775837 A | 5/2006 |
| EP | 0 737 210 B1 | 10/1996 |
| FR | 2 810 042 A1 | 12/2001 |
| WO | 9962957 A1 | 12/1999 |
| WO | 2007121981 A1 | 11/2007 |

OTHER PUBLICATIONS

Chinese Office Action, dated Sep. 9, 2016, from corresponding Chinese Application No. 201380062003.1.
Svetlana Bratskaya et al.: "Effect of Polyelectrolyte Structural Features on Flocculation Behavior: Cationic Polysaccharides vs. Synthetic Polycations", Macromolecular Materials and Engineering, vol. 290, No. 8, Aug. 12, 2005 (Aug. 12, 2012), pp. 778-785, XP055065180, ISSN: 1438-7492, DOI: 10.1002/mame.200400403 p. 6, col. 2, lines 4-end; figure 7.
"Starch Chemistry and Technology"—vol. II—Chapter XVI—R.L. Whistler and E.F. Paschall—Academic Press (1967).
International Search Report, dated Mar. 19, 2014, from corresponding PCT application.

* cited by examiner

Primary Examiner — Nam Nguyen
Assistant Examiner — Julia Wun
(74) Attorney, Agent, or Firm — Blank Rome LLP

(57) ABSTRACT

Disclosed is a method for thickening or dehydrating sludge, which includes at least: a) a step of adding flocculants to the sludge to be treated; b) a step of flocculation by agitation of the sludge with the flocculants thus added in order to form a mixture of flocks and an aqueous solution; c) a step of mechanical separation of the flocks and the aqueous solution formed during the preceding step; d) a step of recovering the aqueous solution and the flocks that make up a treated sludge; wherein: the added flocculants are made up of at least one cationic starch (S) and at least one cationic polyacrylamide (P); the cationic starch or starches (S) including a fixed weight percentage of nitrogen of at least 2%; and the weight ratio (R) $w_s/(w_s+w_p)$, expressed as solids, is included between 0.6 and 0.99.

18 Claims, No Drawings

METHOD FOR THICKENING OR DEHYDRATING SLUDGE

FIELD OF THE INVENTION

The present invention relates to processes for thickening or dehydrating sludge, using at least one cationic starch and a cationic polyacrylamide.

PRIOR ART

The treatment of wastewater coming from human and industrial activity leads to the generation of sludge. Generally speaking, sludge to be treated consists predominantly of water, in which organic matter is intimately dispersed. This sludge undergoes an operation for mechanical separation of the organic matter and the water contained in the sludge. These operations are included in thickening processes in which the step of mechanical separation is generally carried out on a draining table or by flotation or else in sludge dehydrating processes which often use centrifugation, filter press or belt filter techniques. These processes aim to obtain concentrated sludge with a high level of dryness, that is to say aim to concentrate the dry matter of the sludge as much as possible, and to eliminate the water generated. The sludge thus treated, depending on its origin, is then transported to a landfill site, a site for agricultural spreading, or an incineration site.

The current processes for thickening or dehydrating sludge entail the addition of flocculating agents into the sludge to be treated. This will have the effect of generating concentrated organic matter in the form of flocs dispersed in water. These flocs are then separated from the water generated by the mechanical separation operations mentioned previously. However, the latter may impose mechanical stresses on the flocs formed, during their separation, and it is therefore necessary for these flocs to have sufficient mechanical strength to be able to withstand these stresses.

For this purpose, polymers of the polyacrylamide type are mainly currently used in industry. This is because the concentrated sludge flocculated beforehand by these polymers generally has a high level of dryness. Moreover, the flocs have a very high strength and the mechanical thickening or dehydration operation is thus carried out with ease. Despite this, various problems are linked to their use. Firstly, these polymers are manufactured from a monomer, acrylamide, which was added to Annex I of the harmonized European classifications by the 28$^{th}$ Adaptation to Technical Progress (ATP) of Directive 67/548/EEC of Aug. 6, 2001, in which it is notably classed as toxic when ingested and liable to cause genetic mutations or cancer. The risks associated with the manufacture and use of acrylamide are therefore undeniable. The presence of traces of monomer in the polymer also raises numerous debates regarding the use of polyacrylamides, notably in certain countries such as Germany. Moreover, the use of polyacrylamide for the treatment of sludge tends to clog filters when they are used to separate the flocs from the water. Another problem is that these polyacrylamides are also relatively expensive.

Another solution is to use cationic starches instead of polyacrylamides. These products have the advantage of being manufactured from starch, which is a renewable resource. In the more general field of water treatment, not sludge treatment, mention may be made of the document by Bratskaya et al., *Macromol. Mater. and Eng.*, 2005, 290, pages 778-785, which describes the use of cationic starches of various types as flocculant for an aqueous, low concentration kaolin solution (up to 1 g/l of kaolin). These starch-based flocculants allow the problems associated with polyacrylamide to be solved, in so far as they are less costly, and are generally manufactured from products which are less toxic to humans and their environment. Another advantage is that, during a step for separating flocs and water by filtration, no clogging of the filters is observed when these cationic starches are used as flocculant, unlike when polyacrylamides are used. Nevertheless, flocs formed using these cationic starches have a very low strength compared to those obtained using polyacrylamide. The concentrated sludge obtained at the end of the thickening or dehydrating step also has the drawback of having a lower level of dryness than when polyacrylamide is used.

It is also already known to use two flocculants of opposite charge in a sequential process. Thus, in U.S. Pat. No. 4,382,864, a process for dehydrating sludge is described, in which a first step of floc formation is carried out by adding a first flocculant under vigorous stirring, and a second flocculation step is carried out by adding a second flocculant of opposite charge to the first flocculant, under weaker stirring, enabling an increase in the size of the flocs. The anionic and cationic flocculants may be a polyacrylamide and a starch. This process, which comprises at least two successive flocculation steps, is relatively complex to implement and requires precise adjustment of the rate of stirring for each of the flocculation steps.

SUMMARY OF THE INVENTION

There is therefore currently still a need to find thickening or dehydrating processes using small amounts of polyacrylamide and able to be readily implemented, these processes making it possible to obtain sludge with a high level of dryness, and in which the flocs formed during this process have sufficient mechanical strength to allow the flocs and the water to be mechanically separated with ease.

This is precisely what the present invention enables, which relates to a process for thickening or dehydrating sludge, comprising at least:
  a) a step of adding flocculants to the sludge to be treated;
  b) a step of flocculating by stirring the sludge added to in this way so as to form a mixture of flocs and an aqueous solution;
  c) a step of mechanical separation of the flocs and the aqueous solution that were formed in the previous step;
  d) a step of recovering the aqueous solution and the flocs forming a treated sludge;
in which:
  the flocculants added consist of at least one cationic starch (S) and at least one cationic polyacrylamide (P);
  the cationic starch(es) (S) comprise a fixed nitrogen weight percent of at least 2%;
  and the weight ratio (R) $w_S/(w_S+w_P)$ expressed as dry weight is between 0.6 and 0.99.

This process, which uses flocculants of the same (cationic) charge, enables an excellent compromise to be reached and to get close to, match, or even exceed the results obtained with a process using a cationic starch or a cationic polyacrylamide as sole flocculant.

A composition comprising a fluidized cationic starch is described in patent application US 2004/0112559 A1, in the Applicant's name. This cationic starch comprises at most 1.5% fixed nitrogen. This composition may be used for the treatment of industrial wastewater. Moreover, the amylaceous composition may also be combined with a polyacrylamide.

As shown in the examples, these cationic starches, which are useful for the treatment of industrial wastewater and which comprise at most 1.5% fixed nitrogen, do not allow sufficient efficiency in sludge thickening or dehydrating processes when they are combined with a cationic polyacrylamide.

DETAILED DESCRIPTION OF THE INVENTION

The invention relates to a process for the treatment of sludge, more specifically a thickening or dehydrating process, in which various cationic flocculants of sludge are used, that is to say predominantly cationic starch (S) and, in the minority, cationic polyacrylamide (P).

The cationic starch comprises a fixed nitrogen weight percent of at least 2%.

The cationic starch used within the context of the invention may be obtained from any type of native starch of natural or hybrid origin, including starch derived from plant organisms having undergone genetic mutation or manipulation. Said starches may notably be derived from potato, from potato with a high amylopectin content (waxy potato), from wheat, from wheat with a high amylopectin content (waxy wheat), from corn, from corn with a high amylopectin content (waxy corn), from corn with a high amylose content, from rice, from pea, from barley or from cassava, from cuts or fractions which may be made therefrom, and from any mixtures of at least any two of the products mentioned hereinabove. The choice of this native starch influences, for example, the final molecular weight and the degree of branching thereof, which is linked to the content of amylose and amylopectin. According to the invention, the cationic starch is preferably obtained from corn starch, wheat starch, waxy corn starch or from potato flour, most preferably from potato flour.

The cationization reaction may be carried out using cationic reagents such as those described, for example, in "Starch Chemistry and Technology"—Vol. II—Chapter XVI—R. L. WHISTLER and E. F. PASCHALL—Academic Press (1967). The starch is introduced into a reactor in the presence of these reagents.

The reaction is generally carried out in the tacky phase. "Tacky phase" is intended to mean that the starch is at least partly solubilized, generally totally solubilized, in a solvent phase, said solvent phase generally being an aqueous or aqueous-alcoholic phase. At the end of this process a cationic starch is thus obtained in the form of a liquid amylaceous composition. It is also possible to obtain the cationic starch in solid form by drying the composition or else by precipitation from alcohol or an aqueous-alcoholic solvent.

Preferably, the cationization reaction is carried out with nitrogenous reagents based on tertiary amines or quaternary ammonium salts. Among these reagents, preference is given to using 2-dialkylaminochloroethane hydrochlorides such as 2-diethylaminochlorethane hydrochloride or glycidyltrimethylammonium halides and halohydrins thereof, such as N-(3-chloro-2-hydroxypropyl)trimethylammonium chloride, the latter reagent being preferred.

Generally, this reaction is carried out in alkaline medium, at a pH greater than 8, or even greater than 10, the pH possibly being adjusted with sodium hydroxide.

The amounts of reagent used are selected such that the resulting cationic starches have the percentage of nitrogen which was fixed on the starch. The cationic starch (S) according to the invention has a fixed nitrogen weight percent of at least 2%. Preferably, the cationic starch (S) has a fixed nitrogen weight percent ranging from 2.5 to 5%.

The quantities of fixed nitrogen are conventionally determined by the Kjeldahl method.

Nonlimitingly, the processes described in the documents WO 2007121981, EP 737210, WO 9962957, U.S. Pat. No. 2,995,513, U.S. Pat. No. 3,842,005 and U.S. Pat. No. 4,579,944 may be used.

According to the invention, the cationic starch may be added during step a) of the process by way of a liquid amylaceous composition comprising at least one cationic starch. This variant has the advantage of being easy to implement in industrial facilities. Preferably, the concentration by weight of cationic starch of this composition added during step a) ranges from 0.1 to 20 g/l.

In order to produce this amylaceous composition, if this cationic starch is in solid form it may be necessary to solubilize the cationic starch in the solvent. The cationic starch (S) useful for the invention may be soluble in cold water. It may for example be in the form of a powder soluble in cold water. The liquid amylaceous composition is generally an aqueous composition, which may mainly comprise water as solvent and optionally small quantities of organic water-miscible solvents, for instance alcohols such as ethanol, for example in quantities of organic solvent of less than 10% by weight of all the solvents. However, it is also possible to use a liquid amylaceous composition derived from the tacky-phase cationization process described previously.

According to an advantageous variant of the invention, a liquid amylaceous composition of cationic starch, without preservative, is used.

When the cationic starch is in the form of a liquid amylaceous composition, microbial degradation may be observed during the storage thereof and transportation of the product. In order to limit this phenomenon, biocide may be added, which may be selected from phthalates, for example one of those sold by Dow Chemical Company with the brand name Vinyzene™. Now, although the concentration of biocide necessary to preserve the starch, in the form of a liquid solution, is low, these biocides may be undesired constituents for the treatment of sludge, since the treated sludge may be spread after the treatment process, for example. The fact that the starch is stored and transported in solid form limits the problems of degradation. This allows the addition of a preservative to be dispensed with, which may be particularly advantageous in a water treatment process.

The amylaceous composition comprising the cationic starch may also comprise additional constituents, such as biocides described hereinabove.

According to the process of the invention, the polyacrylamide (P) used is cationic polyacrylamide.

As regards the cationic polyacrylamide, it preferably has a high molecular weight, in particular a molecular weight $M_n$ of at least $1 \times 10^6$ g·mol$^{-1}$. Advantageously, the molecular weight $M_n$ of the polyacrylamide ranges from $1 \times 10^6$ to $20 \times 10^6$ g·mol$^{-1}$, notably from $1 \times 10^6$ to $15 \times 10^6$ g·mol$^{-1}$. The cationic polyacrylamide used may be in linear or branched form. Said polyacrylamide may be up to 100% cationic in charge, and preferably between 0.1 and 55%, for example between 0.1 and 25% cationic in charge. Alternatively, the degree of cationicity of the polyacrylamide may be quantified using a flow detector of the Streaming Current Detector (SCD) type, by titration using sodium polyethylene sulfonate. Preferably, the degree of cationicity of the polyacrylamide ranges from 500 to 5000 μeq/g, preferably from 2000 to 4500 μeq/g.

The cationic polyacrylamide may be selected from copolymers of polyacrylamide with cationic monomers or polyacrylamides modified according to the Mannich reaction. As examples of cationic polyacrylamide copolymers, mention may be made of acrylamide/diallyldialkylammonium halide, preferably diallyldialkylammonium chloride, copolymers, diaminoalkyl(meth)acrylate/acrylamide copolymers and dialkylaminoalkyl(meth)acrylate/acrylamide copolymers, trialkylaminoalkyl(meth)acrylate copolymers, with the alkyl groups preferably comprising from 1 to 6 carbon atoms.

According to the invention, the cationic polyacrylamide may be added during step a) of the process by way of a liquid composition comprising at least one cationic polyacrylamide. This variant has the advantage of being easy to implement in industrial facilities. Preferably, the concentration by weight of cationic polyacrylamide in this composition ranges from 0.1 to 20 g/l.

The cationic polyacrylamide useful in the invention may be soluble in cold water. It may for example be in the form of a powder soluble in cold water.

The liquid cationic polyacrylamide composition is generally an aqueous composition, which may mainly comprise water as solvent and optionally small quantities of water-miscible organic solvents, for instance alcohols such as ethanol, for example in quantities of organic solvent of less than 10% by weight of all the solvents.

According to the invention, the cationic starch and the cationic polyacrylamide are added to the sludge to be treated during step a) at a weight ratio (R) $w_S/(w_S+w_P)$ expressed as dry weight of between 0.6 and 0.99.

Unless explicitly specified, it is noted that the quantities of cationic starch and polyacrylamide, i.e. of flocculants, are expressed as dry weight.

R is advantageously between 0.7 and 0.97, preferably between 0.85 and 0.95, most preferably between 0.87 and 0.94.

During the process according to the invention, the cationic starch and the cationic polyacrylamide may be added separately or simultaneously during step a). According to the variant in which the flocculants are added simultaneously, the addition step may be carried out by way of the addition of a liquid composition comprising at least one cationic starch and at least one cationic polyacrylamide.

The flocculants are used in the process of the invention in quantities allowing flocculation of the sludge to be treated. These quantities will be able to be modified by those skilled in the art according to the type of sludge to be treated. Likewise, the quantities will be adapted by those skilled in the art according to the desired mechanical strength of the flocs in order to satisfactorily carry out the steps of b) flocculation and c) mechanical separation which are detailed hereinafter.

The quantities of sludge to be treated by the flocculants are also expressed as dry weight of sludge to be treated.

According to the process of the invention, the total quantity of cationic starch and polyacrylamide may range from 1 to 50 g/kg of sludge to be treated (dry/dry), advantageously from 3 to 35 g/kg (dry/dry), preferably from 4 to 20 g/kg (dry/dry).

According to the process of the invention, the flocculants may be added to the sludge in a single dose or by adding various doses. In the case of a continuous sludge treatment process, it is possible to add to the sludge to be treated by the continuous addition of flocculants.

Although their use is not necessary for carrying out the process according to the invention, other products conventionally used in sludge treatment may also be added during step a), notably coagulants, or even one or more flocculants other than the cationic polyacrylamide(s) (P) and cationic starch(es) (S) useful for the invention. These other flocculants, defined in the present application as "additional flocculants", may be anionic or cationic polysaccharides other than the cationic starches (S), or else may be anionic polyacrylamides. Advantageously, the quantities by weight of additional flocculants are less than 50 g/kg (dry/dry) of sludge to be treated, advantageously less than 30 g/kg (dry/dry), preferably less than 10 g/kg (dry/dry). Most preferably, additional flocculants are not added in the process of the invention.

The sludge to be treated in step a) may be of any type and notably may come from any type of human and industrial activity. The process according to the invention is particularly useful when the sludge comes from municipal effluent or when it is industrial sludge, notably sludge coming from the food-processing industry, such as sludge coming from the starch industry, paper-making industry or chemical industry. The process according to the invention is particularly effective for sludge comprising organic matter in suspension.

According to the process of the invention, the sludge to be treated may undergo pretreatment, for example pretreatment by bacterial digestion or pretreatment by chemical agents, before adding the flocculants in step a). The sludge to be treated may, according to the process of the invention, notably undergo pretreatment using coagulants, for example using metal salts. The sludge to be treated is generally an aqueous composition comprising water and matter in suspension, with the quantity of matter in suspension being greater than or equal to 0.2% of the weight of the aqueous composition.

Step b) of the process consists of a step of flocculating by stirring the sludge with the flocculants added to it so as to form a mixture of flocs and aqueous solution. This step is conventionally carried out in a flocculator.

As explained previously, the cationic starch (S) and the polyacrylamide (P) may be introduced separately, with a delay between each of the introductions. This delay is generally less than a few minutes, for example less than 1 minute. It is therefore possible to carry out a first step of flocculation after a first step of addition of a first flocculant, then a second step of flocculation after a second step of addition of a second flocculant.

Nevertheless, it is preferable, for reasons of process simplicity, to conduct just one step of flocculation b) after a step of addition a) of a composition comprising (S) and (P).

Another subject of the invention is therefore a composition, able to be used in the process according to the invention, comprising at least one cationic starch (S) and at least one cationic polyacrylamide (P), in which composition:
  the cationic starch(es) (S) comprise a fixed nitrogen weight percent of at least 2%;
  and the weight ratio (R) $w_S/(w_S+w_P)$, expressed as dry weight, is between 0.6 and 0.99.

The preferred variants described above for the process according to the invention, relating to (S) and (P) and the relative proportions thereof, are also preferred variants of the composition according to the invention.

The composition according to the invention is generally in the form of a liquid composition comprising at least one cationic starch and at least one cationic polyacrylamide, both solubilized. This composition according to the invention has the advantage of being easy to use in industrial facilities. To produce this liquid composition according to the invention, a cationic starch in solid form may be solubilized in a solvent. The cationic starch useful for the invention may be soluble in cold water. It may for example be in the form of a powder soluble in cold water. The liquid composition according to the invention, a cationic starch and a cationic polyacrylamide, both in solid form, may be solubilized in a solvent. The liquid composition according to the invention may also be manufactured by solubilizing a cationic polyacrylamide in a cationic starch glue. The liquid composition according to the invention is generally an aqueous composition, which may mainly comprise water as solvent and optionally small quantities of water-miscible organic solvents, for instance alcohols such as ethanol, for example in quantities of organic solvent of less than 10% by weight of all the solvents.

Preferably, the quantity by weight of the sum of cationic starch and cationic polyacrylamide ranges from 0.01 to 70%, advantageously from 20 to 60% and preferably from 30 to 50% relative to the total weight of the composition.

When it is desired to transport or store this composition, it is preferable for the quantity by weight of the sum of cationic starch and cationic polyacrylamide in said composition to range from 10 to 70%, advantageously from 20 to 60%, preferably from 30 to 50%.

When it is desired to use the composition in the process according to the invention, it is preferable for the quantity by weight of the sum of cationic starch and cationic polyacrylamide to range from 0.01 to 2%.

According to the process of the invention, the flocculated sludge obtained in step b) is subjected to at least one step c) of mechanical separation, in order to separate the flocs and aqueous solution that were obtained previously.

According to one embodiment, this step c) is carried out by treatment of the flocculated sludge obtained in step b) by passing over a draining table, by centrifugation and/or by flotation. These techniques are generally used when it is desired to carry out a process for thickening the sludge. These processes generally make it possible to obtain a medium level of dryness of the sludge, this level of dryness ranging from 4 to 10%, often from 5 to 7%. The sludge thus obtained is generally in liquid form.

According to another embodiment, this step c) is carried out by treatment of the flocculated sludge obtained in step b) by centrifugation and/or by passing over a filter press or belt filter. These techniques are generally used when it is desired to carry out a process for dehydrating the sludge. These processes, depending on the technique used, make it possible to obtain a high level of dryness of the sludge, this level of dryness generally ranging from greater than 10% and ranging up to 40%. It is to be noted that centrifugation is a technique which enables a medium or high level of dryness of the treated sludge to be obtained, depending on the setting of the centrifuge chosen by those skilled in the art.

According to the invention, the process may comprise various successive separation steps. By way of example, it is possible to carry out a process for dehydrating sludge comprising a first step of separation by passing over a draining table, by centrifugation and/or by flotation then a second step of separation by centrifugation and/or passing over a filter press or belt filter.

By virtue of the specific combination of polyacrylamide and starch type flocculants, the process according to the invention enables large quantities of water to be eliminated from the sludge to be treated, with results which come close to, or even exceed in terms of some properties, those obtained with similar processes which exclusively use cationic polyacrylamides. This therefore enables smaller quantities of polyacrylamide to be used compared to the processes already known, while retaining an efficient process. In particular, the sludge treated according to the invention may have a level of dryness of at least 4%, generally ranging from 4 to 60%, generally not exceeding 40%, advantageously greater than 10%, preferably at least 20%, at the end of step d).

According to the process of the invention, the successive steps a), b), c) and d) may be carried out once or several times. This means that the treated sludge recovered in step d) may optionally undergo another treatment by the successive steps a), b), c) and d).

The invention will now be illustrated in the following nonlimiting examples of the present invention.

Example 1: Study of the Effect of the Cationicity of the Starch

Solutions of cationized potato flour are prepared by following the teaching of U.S. Pat. No. 4,579,944, these potato flours having various degrees of cationicity expressed as fixed nitrogen percent (% N), this percentage being specified in table 1.

TABLE 1

| Product | % N |
|---------|-----|
| Starch 1 | 1.2 |
| Starch 2 | 1.5 |
| Starch 3 | 2.0 |
| Starch 4 | 3.0 |
| Starch 5 | 4.0 |

A cationic polyacrylamide, hereinafter denoted PAM (FLOPAM DW 2160 sold by SNF in the form of powder with 83.5% dry matter, having an ionic charge (SCD) of +2900 µeq/g), is also used as flocculant. It is prepared beforehand in the form of a 1% solution with magnetic stirring for 1 h before use for the treatment of sludge.

These solutions of cationic starch are tested by the jar test as flocculant for sludge from a purification plant from the starch industry, along with the cationic polyacrylamide, with a weight ratio R $w_S/(w_S+w_P)$ equal to 0.8 (dry/dry), for a total of 18 grams of dry product per kilogram of dry sludge (g/kg of dry sludge). A reference test is carried out with the polyacrylamide alone at an equivalent dose, i.e. 3.6 g/kg of dry sludge. The characteristics of the sludge to be treated are given in table 2.

TABLE 2

| Dry matter | 1.5% |
| Chemical oxygen demand | 18.30 g/l |
| Matter in suspension | 18.10 g/l |
| Calcium | 604 mg/kg |

First of all, the polyacrylamide solution is added with stirring for 10 seconds at 200 revolutions per minute (rpm). Then, the starch solution is added with stirring for 30 seconds at 45 rpm. The results of the flocculation are then expressed as the size of the flocs in the beaker (graded from 0 to 10: 0=no visible flocs, 10=very large flocs). Then, the flocculated sludge is filtered on a sieve with a mesh size of 500 µm; the following are then evaluated:

the quality of the flocs retained on the sieve (graded from 0 to 10: 0=no visible flocs, 10=very large flocs);

the rate of filtration through the sieve (as volume collected over time, in ml/s);

the quantity of flocs passing through the sieve (% by weight of flocs in the filtrate);
the turbidity of the filtrate (in NTU).
The results are given in table 3.

TABLE 3

| % N of the starch | Flocs beaker | Flocs sieve | Turbidity of the filtrate (NTU) | % flocs in the filtrate | Volume of filtrate (ml/s) | | |
|---|---|---|---|---|---|---|---|
| | | | | | 10 s | 30 s | 300 s |
| Without starch (PAM) | 2 | 1 | 70.0 | 56.7 | 150 | 190 | 300 |
| 1.2 | 3 | 2 | 17.0 | 14.0 | 130 | 180 | 285 |
| 1.5 | 4 | 2 | 17.0 | 13.0 | 120 | 190 | 280 |
| 2.0 | 6 | 3 | 18.0 | 8.3 | 210 | 260 | 300 |
| 3.0 | 8 | 5 | 14.0 | 6.3 | 260 | 290 | 315 |
| 4.0 | 9 | 8 | 16.0 | 3.2 | 270 | 290 | 310 |

A clear improvement in flocculation is observed when the nitrogen content of the starch is greater than or equal to 2%. In particular the starch improves the flocculating capacity so as to generate more flocs which are large enough to be retained on the sieve. Filtration is rapid since 70% of the volume of filtrate has passed through the sieve after just 10 seconds. Moreover, the percentage of flocs in the filtrate is less than 10%, which is similar to the values obtained with the commercially available synthetic flocculants. The polyacrylamide alone does not explain such efficiency because at an equivalent dose in the absence of starch the result is mediocre.

Example 2: Study of Simultaneous or Separate Addition

In this example, flocculants based on starch 5 and PAM are tested by the jar test according to two modes of addition at different ratios. The total dose of flocculants is 32 g/kg.
The sludge is the same as in the previous example, as is the protocol with the exception of stirring time and stirring speed.
Addition in 1 step ("1 step"): Both products added at the same time with stirring at 200 rpm for 5 s, by way of a single composition comprising PAM and starch.
Addition in 2 steps ("2 step"): PAM added with stirring at 200 rpm for 10 s then starch added with stirring at 45 rpm for 40 s.
The percentage efficiency in terms of the rheological strength of the flocs and also the percentage of flocs in the filtrate are determined.
The measurement of the strength of the flocs consists in measuring the stress at which the flocs are destroyed, when the flocs retained on the sieve are tested at 20° C. on an AR2000 rheometer using a concentric cylinder-type measurement geometry at a frequency of 1 Hz, with the stress increasing from 0.02 to 880 Pa.
For easier interpretation of the results, the latter are given in terms of percentage efficiency. This percentage efficiency is calculated relative to the reference value of 100%, which is the stress obtained for the strength of the flocs obtained using the process which comprises adding flocculants in one step for the starch/PAM mixture comprising 98% by weight of starch. This reference was chosen because it was possible to observe that at this dose the sludge treatment is carried out very easily and rapidly, notably in terms of the filtration of the flocs on the sieve.

When this efficiency becomes too low, the flocs may tend to crumble and/or the flocs may pass through the sieve and the sludge treatment then becomes more difficult.
Nonetheless, it was possible to observe that an efficiency of less than 100% could also suffice for satisfactory treatment of the sludge.
The calculated percentage efficiency makes it possible to easily classify the various treatments.
The results are given in table 4.

TABLE 4

| % starch in the mixture | % efficiency | | % floes in the filtrate | |
|---|---|---|---|---|
| | 1 step | 2 step | 1 step | 2 step |
| 98 | 100 | 64 | 3.1 | 6.3 |
| 85 | 128 | 100 | 0.7 | 1.4 |
| 80 | 200 | 160 | 0.3 | 0.7 |

The results show the advantage of using a single flocculant composition for the treatment of sludge according to the invention, because the results are improved when the products are added simultaneously.
Generally speaking, it was possible to note that good floc strength enables flocs to be obtained which do not pass through the sieve. Good floc strength therefore constitutes a good indicator for comparing various treatment processes with one another.

Example 3: Effect of the Weight Ratio R and Effect of the Quantity of Flocculant Sludge from a purification plant is treated with each of the four solutions based on cationic potato flour from example 1 or with a cationic polyacrylamide at various doses ranging from 4 to 32 g of flocculant per kg of dry sludge to be treated.
The sludge and the protocol are the same as in example 1.
The percentage efficiency for the floc strength is measured as in example 2.
This stress is expressed as a percentage relative to the reference value of 100% obtained for the flocs obtained with PAM at a dose of 16 g/kg. This reference was chosen because it was possible to observe that at this dose the sludge treatment is carried out very easily and rapidly, notably in terms of the filtration of the flocs on the sieve.
The results for PAM used alone are given in table 5.

TABLE 5

| % efficiency | Dose of flocculant in g/kg | | | |
|---|---|---|---|---|
| | 4 | 8 | 16 | 32 |
| PAM | 4 | 32 | 100 | 126 |

The results for the solutions of starches alone are given in table 6.

TABLE 6

| % efficiency | Dose of flocculant in g/kg | | | | |
|---|---|---|---|---|---|
| | 4 | 8 | 16 | 24 | 32 |
| STARCH 1 | 3 | 4 | 8 | 10 | 16 |
| STARCH 3 | 3 | 6 | 16 | 20 | 26 |

TABLE 6-continued

| % efficiency | Dose of flocculant in g/kg | | | | |
|---|---|---|---|---|---|
| | 4 | 8 | 16 | 24 | 32 |
| STARCH 4 | 3 | 10 | 20 | 32 | 40 |
| STARCH 5 | 2 | 5 | 20 | 25 | 32 |

It is seen here that irrespective of the cationic starch and the dose, 100% efficiency can not be reached.

A sludge treatment process is now carried out which is identical except that a mixture of cationic starch and PAM is used instead of the solution of starch or PAM. The starch/PAM weight ratio is varied, as is the dose of this mixture.

The results for the mixtures containing PAM and the STARCH 5 solution are given in table 7.

TABLE 7

| Total dose (g/kg) | % starch in the mixture | Dose of starch (g/kg) | Dose of PAM1 (g/kg) | % efficiency |
|---|---|---|---|---|
| 8 | 95 | 7.6 | 0.4 | 16 |
| 8 | 80 | 6.4 | 1.6 | 25 |
| 8 | 70 | 5.6 | 2.4 | 40 |
| 8 | 50 | 4 | 4 | 32 |
| 16 | 95 | 15.2 | 0.8 | 50 |
| 16 | 90 | 14.4 | 1.6 | 60 |
| 16 | 80 | 12.8 | 3.2 | 80 |
| 16 | 70 | 11.2 | 4.8 | 100 |
| 16 | 50 | 8 | 8 | 200 |
| 32 | 95 | 30.4 | 1.6 | 160 |
| 32 | 90 | 28.8 | 3.2 | 200 |
| 32 | 80 | 25.6 | 6.4 | 250 |

As explained above, 100% efficiency enables excellent sludge treatment to be carried out. Nonetheless, this value is only a reference and it is entirely possible to satisfactorily treat the sludge while obtaining a strength less than 100%.

From the results hereinabove, the conclusion is drawn that it is thus possible to obtain 50% efficiency with a dose of 16 g/kg, using a mixture of cationic starch/PAM flocculants comprising only 5% PAM (i.e. 0.8 g of PAM per kg of sludge treated). This efficiency is for example greater than that obtained for a treatment in which the flocculant consists solely of PAM at a dose of 8 g/kg.

At an equivalent dose of 16 g/kg, a treatment with a flocculant mixture comprising 30% PAM (4.8 g of PAM per kg of sludge treated) is even just as efficient as a treatment with a flocculant consisting solely of PAM. If 100% efficiency is sought, it is also possible to opt for a treatment with a minimal dose of PAM (1.6 g/kg), using a flocculant mixture with a ratio R of 0.95 at a dose of 32 g per kg of dry sludge.

In conclusion, it is possible to carry out a highly efficient sludge treatment, using the process according to the invention, while using very limited quantities of polyacrylamide.

Example 5: Treatment of Paper-Making Sludge

Starch 5 and PAM are tested in the jar test as flocculant for the treatment of paper-making sludge. The characteristics of the sludge are given in table 8.

TABLE 8

| Dry matter | 2.3% |
|---|---|
| Chemical oxygen demand | 14.50 g/l |
| Matter in suspension | 21.74 g/l |
| Calcium | 4700 mg/kg crude |

The STARCH 5 solution and the PAM solution are tested alone or as a mixture, at a variable dose.

As in the preceding example, the percentage efficiency is determined relative to the reference value of 100% obtained for flocs obtained with PAM at a dose of 16 g/kg.

With a view to easier comparison, a theoretical percentage efficiency is calculated for the processes using a mixture, this theoretical percentage being calculated by taking the weight average of the percentage efficiencies of the processes using either starch alone or PAM alone.

The results are given in table 9.

TABLE 9

| Products | Dose of flocculant (g/kg) | % efficiency | theoretical % efficiency |
|---|---|---|---|
| Crude sludge | 0 | 0% | |
| PAM | 4 | 20% | |
| | 16 | 100% | |
| | 32 | 125% | |
| STARCH 5 | 4 | 8% | |
| | 16 | 25% | |
| | 32 | 15% | |
| PAM/STARCH 5 (10/90) | 4 | 16% | 9.2% |
| | 16 | 40% | 32.5% |
| | 32 | 125% | 26% |

On this sludge, the percentage efficiency of STARCH 5 used alone remains low, irrespective of the quantity of flocculant used.

PAM enables effective sludge treatment to be carried out.

In the case of the processes using mixtures, improvement of the strength of the flocs compared to the theoretical strength is achieved in all cases. This improvement is particularly pronounced in this example when the flocculant dose is 32 g per kg of dry sludge.

Example 6: Effect of the Botanical Origin

Three solutions of different botanical origin are prepared with an equivalent procedure and an equivalent degree of cationicity, in order to obtain a fixed nitrogen percent equal to 3%.

Waxy corn has a high proportion of amylopectin, while pea is richer in amylose than is potato.

These solutions are tested in the jar test as flocculant for the sludge from example 1, jointly with the PAM solution, at a ratio R of 0.8 for a total of 18 g/kg of dry sludge. A reference test is carried out with the polyacrylamide alone at an equivalent dose, i.e. 3.6 g/kg of dry sludge. The protocol is the same as in example 1. The results are given in table 10.

TABLE 10

| Origin of starch | Flocs beaker | Flocs sieve | Turbidity of filtrate (NTU) | % flocs in the filtrate | Volume of filtrate (ml/s) | | |
|---|---|---|---|---|---|---|---|
| | | | | | 10 s | 30 s | 300 s |
| No starch | 2 | 1 | 70 | 57 | 150 | 190 | 300 |
| Waxy corn | 7 | 7 | 16 | 6 | 190 | 250 | 305 |

TABLE 10-continued

| Origin of starch | Flocs beaker | Flocs sieve | Turbidity of filtrate (NTU) | % flocs in the filtrate | Volume of filtrate (ml/s) | | |
|---|---|---|---|---|---|---|---|
| | | | | | 10 s | 30 s | 300 s |
| Potato | 8 | 5 | 14 | 6 | 260 | 290 | 315 |
| Pea | 5 | 4 | 13 | 10 | 265 | 295 | 325 |

Flocculation is good, irrespective of the botanical origin of the starch.

Nonetheless, the use of potato in the process makes it possible to obtain slightly better results than when pea or waxy corn is used. Indeed, when potato is the base, the quantity of flocs passing through the sieve is lower compared to pea, while the rate of filtration is higher than when waxy corn is the base.

The invention claimed is:

1. A process for thickening or dehydrating sludge, comprising at least:
   a) a step of adding flocculants to the sludge to be treated;
   b) a step of flocculating by stirring the sludge added to in this way so as to form a mixture of flocs and an aqueous solution;
   c) a step of mechanical separation of the flocs and the aqueous solution that were formed in step b);
   d) a step of recovering the aqueous solution and the flocs forming a treated sludge;
   wherein:
      the flocculants added consist of at least one cationic starch (S) and at least one cationic polyacrylamide (P);
      the cationic starch(es) (S) comprise a fixed nitrogen weight percent of at least 2.5%; and
      the weight ratio (R) $w_S/(w_S+w_P)$ expressed as dry weight is between 0.6 and 0.95.

2. The process as claimed in claim 1, wherein R is between 0.7 and 0.95.

3. The process as claimed in claim 1, wherein R is between 0.85 and 0.95.

4. The process as claimed in claim 1, wherein R is between 0.87 and 0.94.

5. The process as claimed in claim 1, wherein the cationic starch (S) has a nitrogen weight percent ranging from 2.5 to 5%.

6. The process as claimed in claim 1, wherein the cationic starch is obtained from corn starch, wheat starch, waxy corn starch or from potato flour.

7. The process as claimed in claim 1, wherein the cationic starch is added by way of a liquid amylaceous composition comprising at least one cationic starch.

8. The process as claimed in claim 1, wherein the cationic starch and the cationic polyacrylamide are added separately during step a).

9. The process as claimed in claim 1, wherein the cationic starch and the cationic polyacrylamide are added simultaneously during step a).

10. The process as claimed in claim 9, wherein the cationic starch and the cationic polyacrylamide are added simultaneously by way of a liquid composition comprising at least one cationic starch and at least one polyacrylamide.

11. The process as claimed in claim 1, wherein the polyacrylamide has a degree of cationicity ranging from 500 to 5000 µeq/g by ionicity measurement using a flow detector of the Streaming Current Detector (SCD) type, by titration using sodium polyethylene sulfonate.

12. The process as claimed in claim 1, wherein the total quantity of cationic starch and polyacrylamide as dry weight ranges from 1 to 50 g/kg of sludge to be treated (dry/dry).

13. The process as claimed in claim 1, wherein the sludge to be treated has undergone pretreatment using coagulants.

14. The process as claimed in claim 1, wherein the sludge to be treated in step a) comes from industrial sludge.

15. The process as claimed in claim 1, wherein at least one step of mechanical separation c) is carried out by treatment of the flocculated sludge by passing over a draining table and/or by flotation of the sludge.

16. The process as claimed in claim 1, wherein at least one step of mechanical filtration c) is carried out by treatment of the flocculated sludge by centrifugation or by passing over a filter press.

17. The process as claimed in claim 1, wherein the treated sludge obtained in step d) has a level of dryness of at least 4%.

18. A composition comprising at least one cationic starch (S) and at least one cationic polyacrylamide (P), in which composition the cationic starch(es) (S) comprise a fixed nitrogen weight percent of at least 2.5% and the weight ratio (R) $w_S/(w_S+w_P)$ of which, expressed as dry weight, is between 0.6 and 0.95.

* * * * *